US008500143B2

(12) United States Patent
Yu et al.

(10) Patent No.: US 8,500,143 B2
(45) Date of Patent: Aug. 6, 2013

(54) WALKING ASSISTANCE DEVICE WITH DETECTION MEMBERS

(75) Inventors: Chung-huang Yu, Taipei County (TW); Chih-wei Chien, Nantou County (TW)

(73) Assignee: National Yang-Ming University, Taipei (TW)

(*) Notice: Subject to any disclaimer, the term of this patent is extended or adjusted under 35 U.S.C. 154(b) by 638 days.

(21) Appl. No.: 12/784,823

(22) Filed: May 21, 2010

(65) Prior Publication Data

US 2011/0166753 A1 Jul. 7, 2011

(30) Foreign Application Priority Data

Jan. 7, 2010 (TW) ............................... 99100295 A

(51) Int. Cl.
*B62M 6/00* (2010.01)

(52) U.S. Cl.
USPC ..................................... 280/87.021; 180/19.3

(58) Field of Classification Search
USPC ................. 180/167, 169, 19.1, 19.2; 135/67; 280/87.021
See application file for complete search history.

(56) References Cited

U.S. PATENT DOCUMENTS 3,872,945 A * 3/1975 Hickman et al. ............. 180/65.6
4,109,186 A * 8/1978 Farque .......................... 318/587
4,280,578 A * 7/1981 Perkins .......................... 180/6.5
4,280,580 A * 7/1981 Wojcik .......................... 180/169
4,463,817 A * 8/1984 Mennesson ................ 180/65.51
4,627,511 A * 12/1986 Yajima .......................... 180/167
4,710,020 A * 12/1987 Maddox et al. .............. 356/3.13
4,757,450 A * 7/1988 Etoh ............................... 701/96
4,768,536 A * 9/1988 Hawkins ......................... 135/67
4,776,415 A * 10/1988 Brice .............................. 180/11
4,844,493 A * 7/1989 Kramer ......................... 180/169
4,855,717 A * 8/1989 Hafner .......................... 340/556
5,013,032 A * 5/1991 Baum et al. ...................... 482/68
5,224,562 A * 7/1993 Reed .............................. 180/6.5
5,311,880 A * 5/1994 Lancaster et al. ............. 600/595
5,351,778 A * 10/1994 Shigemi et al. ............... 180/167
5,794,639 A * 8/1998 Einbinder ....................... 135/67

(Continued)

FOREIGN PATENT DOCUMENTS

TW 258922 10/1995
TW M248446 11/2004
TW 200927078 7/2009

OTHER PUBLICATIONS

Chien, et al., Development of Intelligent Walker with Dynamic Supportably, Department of Physical Therapy and Assistive Technology, National Yang-Ming University, Master Thesis, Jul. 2009, pp. 1-99.

(Continued)

*Primary Examiner* — Katy M Ebner
(74) *Attorney, Agent, or Firm* — Muncy, Geissler, Olds & Lowe, PLLC

(57) ABSTRACT

The present invention relates to a walking assistance device with detection function, which includes a movable frame, a power transmission device mounted under the frame, a detachable power unit mounted on the frame, at least one signal transmitter and at least one signal receiver for detecting the distances from a first portion and a second portion on the user's body to a correspond position of the frame respectively. According to the distances detected, a control unit sends signals to the power transmission device to maintain the distance between the user and the frame within a preset range, therefore to provide supporting forces when the user needs.

12 Claims, 6 Drawing Sheets

(56) References Cited

U.S. PATENT DOCUMENTS

| | | | | |
|---|---|---|---|---|
| 5,795,269 | A * | 8/1998 | Bawtree et al. | 482/66 |
| 6,378,883 | B1 * | 4/2002 | Epstein | 280/250.1 |
| 6,536,544 | B1 * | 3/2003 | Egawa et al. | 180/19.3 |
| 6,659,478 | B2 * | 12/2003 | Hallgrimsson et al. | 280/47.36 |
| 7,066,484 | B2 * | 6/2006 | Willis et al. | 280/642 |
| 7,204,328 | B2 * | 4/2007 | LoPresti | 180/6.5 |
| 7,422,550 | B1 * | 9/2008 | Pinero et al. | 482/68 |
| 7,445,217 | B1 * | 11/2008 | Price | 280/87.021 |
| 7,484,740 | B2 * | 2/2009 | Miller | 280/87.021 |
| 7,540,342 | B1 * | 6/2009 | Ein | 180/19.1 |
| 7,708,120 | B2 * | 5/2010 | Einbinder | 188/31 |
| 7,826,983 | B2 * | 11/2010 | Alwan et al. | 702/33 |
| 7,832,515 | B2 * | 11/2010 | Barthelt | 180/167 |
| 7,963,294 | B1 * | 6/2011 | Trout | 135/66 |
| 2003/0076067 | A1 * | 4/2003 | Ashmore et al. | 318/662 |
| 2005/0077345 | A1 * | 4/2005 | March | 235/95 R |
| 2006/0163829 | A1 * | 7/2006 | Livengood et al. | 280/87.021 |
| 2006/0292533 | A1 * | 12/2006 | Selod | 434/247 |
| 2008/0042853 | A1 * | 2/2008 | Dempsey | 340/573.1 |
| 2009/0242284 | A1 * | 10/2009 | Whetstone, Jr. | 180/19.2 |
| 2011/0118898 | A1 * | 5/2011 | Fu et al. | 701/1 |

OTHER PUBLICATIONS

Yang, Design and Clinical Assessment of a Rollator with Assistive Brake Control for the Severely Disabled, Master Thesis of Institute of Biomedical Engineering, National Taiwan University, pp. 1-112, Jun. 30, 2004.

Miyawaki, et al., Evaluation of the Gait of Elderly People Using an Assisting Cart (Gait on Flat Surface), The Japan Society of Mechanical Engineers, Series C, vol. 43, No. 4, 2000, pp. 966-974.

Chuy, Jr., et al., Motion Control Algorithms for a New Intelligent Robotic Walker in Emulating Ambulatory Device Function, Proceedings of the IEEE International Conference on Mechantronics & Automation, Niagra Falls, Canada, Jul. 2005, pp. 1509-1514.

Sabatini, et al., A Mobility Aid for the Support to Walking and Object Transportion of People with Motor Impairments, Proceedings of the 2002 IEEE/RSJ Intl. Conference on Intelligent Robots and Systems EPFL, Lausanne, Switzerland, Oct. 2002, pp. 1349-1354.

* cited by examiner

WALKING ASSISTANCE DEVICE WITH DETECTION MEMBERS

FIELD OF THE INVENTION

The present invention relates to a walking assistance device, and more particularly, to a walking assistance device with detection members to check the distance between the walking assistance device and the user so as to control the driving of the device.

BACKGROUND OF THE INVENTION

The main purpose of this invention is to provide a walking assistance device with dynamic support by using a sensing device to detect the distances between the device and the user's individual legs. As we know, a walking assistance device related to this invention was designed by a Japanese scholar Ohigata (as showed in FIG. 1). His design included a frame with multiple rollers, a driving motor to control the motion of frame, and a detection setup to detect the distance between the user and the movable frame.

The detection setup in Ohigata's design is to detect the distance between the user's belly and the walking assistance device. When the distance is less than a pre-set value, the control system of the walking assistance device determines that the user is moving forward and commands the motor to activate the rollers to move forward. When the distance is larger than the pre-set value, the control system sends a signal to let the motor rotate in reversed direction, and thereby the walking assistance device moves backward to keep the distance in the preset range.

As showed in FIG. 1, the detecting and operating ways of Ohigata's walking assistance device is not safe for the user. In FIG. 1, status "a" shows that the user is not moving and status "b" shows that the user starts to move forward, and statuses "c" and "d" show that the user does not move but the frame moves forward, which may make user's upper body lean forward. As the motor works normally to move the frame forward, the distance between the user's belly and the detection member is not changed, and the system cannot determine if the user will fall down or not. Statuses "e" and "f" show that the user starts to move but his speed is much slower than that of the rollers. Eventually, the user falls down for that the system cannot detect the situation by simply checking the distance from the user's belly to the detection member.

Furthermore, the rear rollers "g" located on two sides of the frame close to the user are designed to turn freely in every direction. In consequence, the frame does not turn about the user when the user wants to turn. Even worse, when the user falls laterally, the two rollers "g" cannot perform a braking function to stop the sliding.

SUMMARY OF THE INVENTION

The main purpose of this invention is to provide dynamic support no matter when the user is walking or standing and to assist the user to move forward or backward without the drawbacks found in the other similar devices.

In one aspect, this invention provides a walking assistance device equipped with a sensing device to detect the distances between the walker and the user's individual legs. Based on the measured individual distances, a special control strategy is employed such that the invention can provide dynamic support and assistance.

In one embodiment of the present invention, the walking assistance device includes a frame with two fixed-direction wheels connected to the rear end of the frame, and a guide wheel mounted to the front end of the frame; a power transmission device, which connects the frame and one of the fixed-direction wheels or the guide wheel; a distance detection device, which is attached to the frame and detects the distance between the two separated positions of the user's body and the frame, wherein the distance is changeable while using the walking assistance device; and a control device, which is attached to the frame and receives the signals from the distance detection device. The control device includes a calculator to calculate the distances between the two separated positions of the user and the frame and accordingly to send a driving signal to the power transmission device to drive the fixed-direction wheels or the guide wheel. The power transmission device keeps the user within a preset distance range from the frame of the walking assistance device.

In another aspect, the present invention provides a method for walking assistance, which comprises:

providing a walking assistance device having a power transmission device;

providing a distance detection device to detect the signals from the index members on the two legs of the user using the walking assistance device; and collecting and transferring the signals to the control device for calculating the distance between the walking assistance device and the two legs of the user and sending a control signal to the power transmission device.

The primary object of the present invention is to provide a walking assistance device, which can detect the distance between the frame of the walking assistance device and the user and therefore set the appropriate output to the driving device.

Another object of the present invention is to provide a walking assistance device, wherein the distance between the frame and the legs of the user is detected and checked so as to prevent from falling.

The present invention will become more obvious from the following description when made reference to the accompanying drawings which show, for purposes of illustration only, a preferred embodiment in accordance with the present invention.

DETAILED DESCRIPTION OF THE PREFERRED EMBODIMENT

Figure 1:
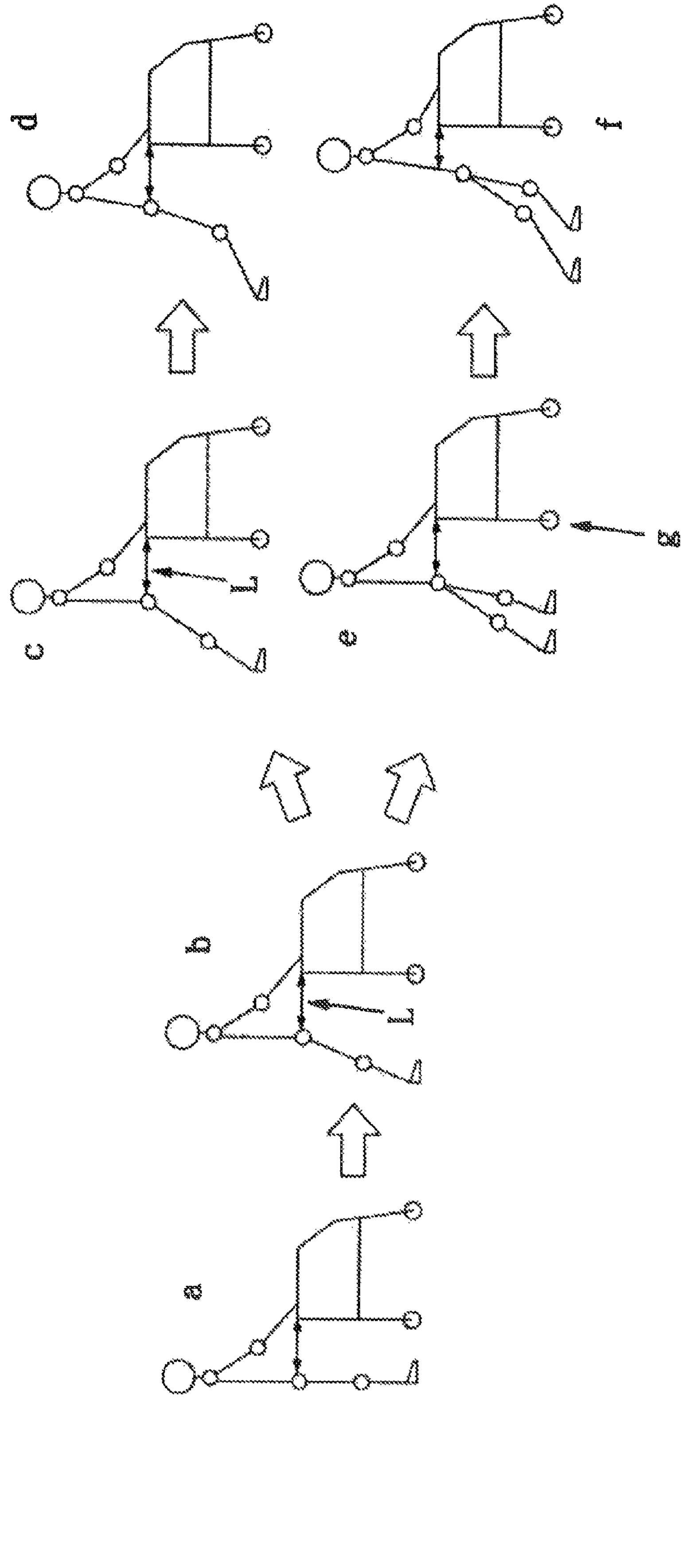
Fig. 1 (Prior Art)
FIG. 1 shows the using statuses of a similar walking assistance device designed by Ohigata.
Figure 2:
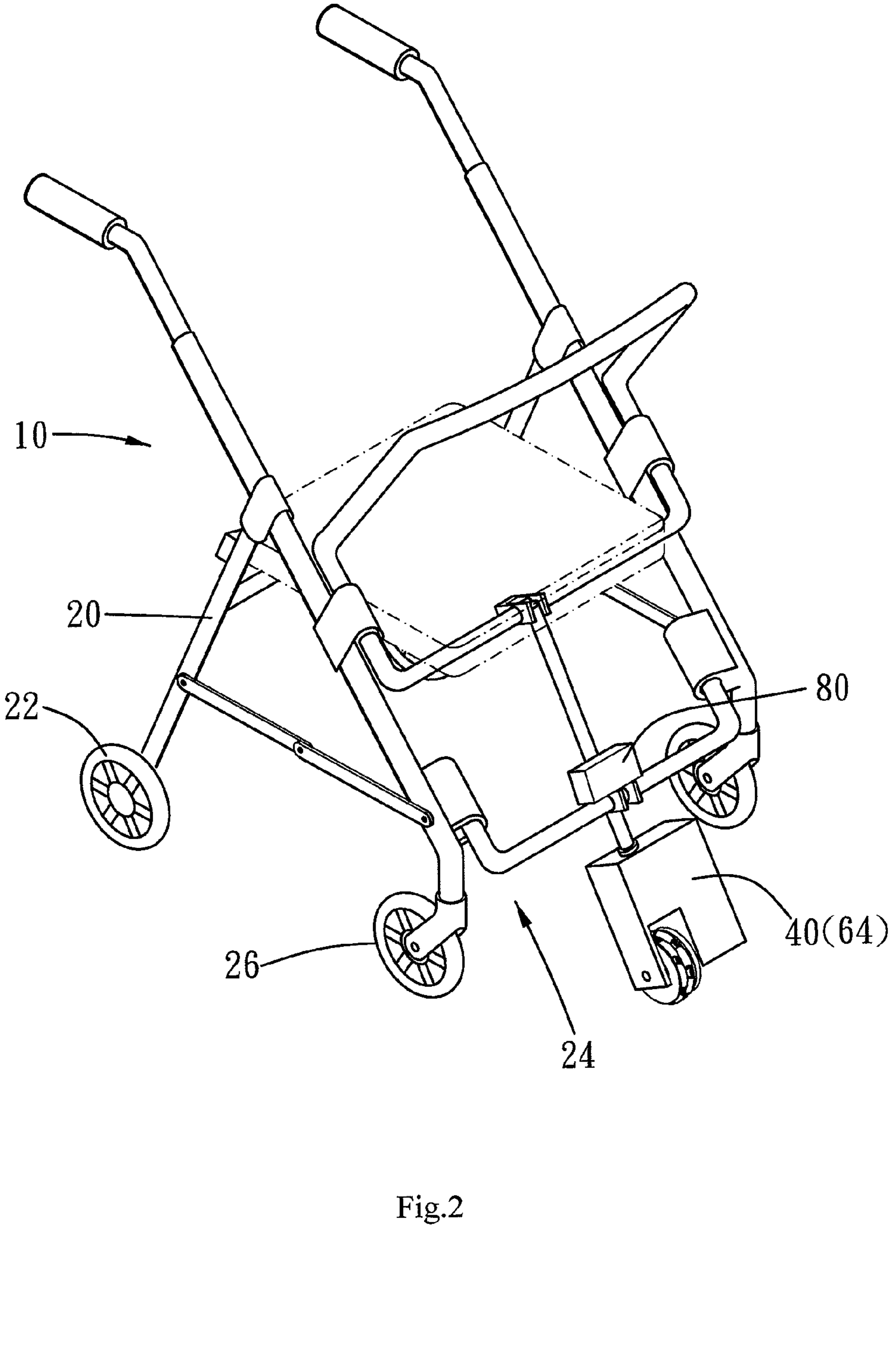
FIG. 2 is a perspective view to show the walking assistance device of the present invention.
Figure 3:
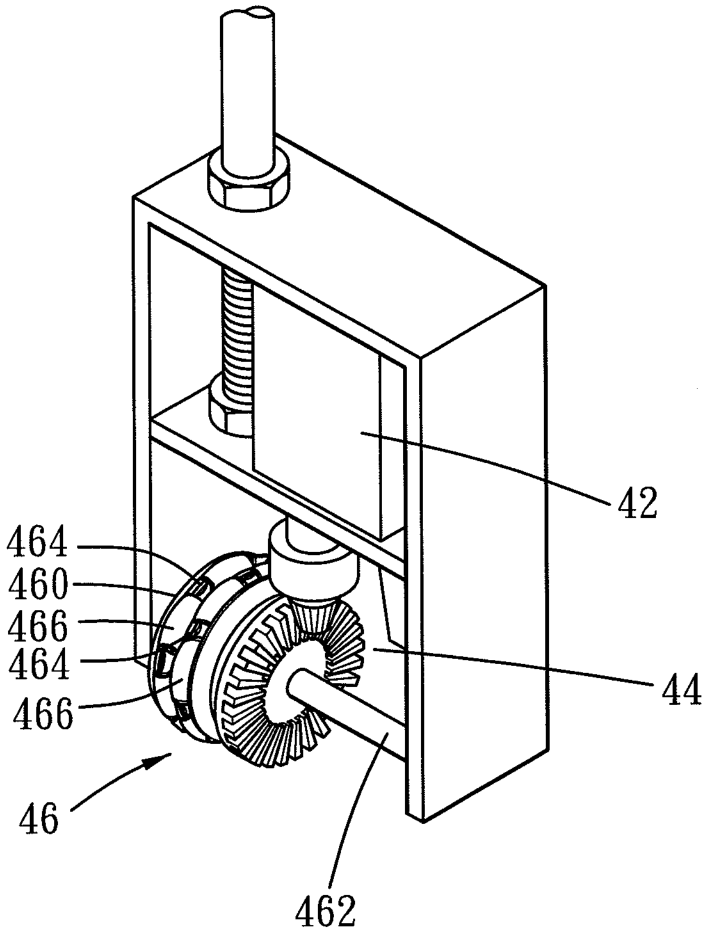
FIG. 3 shows a detailed view of the power transmission device of one embodiment of the walking assistance device according to the present invention.
Figure 4:
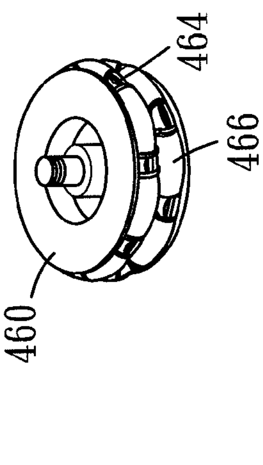
FIG. 4 shows the guide wheel of one embodiment of the walking assistance device according to the present invention.

Referring to FIGS. 2 to 4, the walking assistance device of the present invention comprises a movable frame 20 to which a power transmission device 40 and a detachable distance detection device 60 for detecting the distance between the frame 20 and the user's legs. A control device 80 for controlling the power transmission device 40 is attached to the frame 20.

The frame 20 includes a holding part with proper shape and structure for user's holding, and a moving unit which allows the frame 20 to be stably located on the ground. The moving unit comprises two fixed-direction wheels 22, which are mounted to the rear end of the frame 20 and rotatable toward a pre-set direction, such as back and forth. The two fixed-direction wheels 22 are located on two sides of the frame 20 and separated by a distance defined as zone 24, where the user can stand or walk within. Two turning wheels 26 are mounted to the front end of the frame 20 and are rotatable in all direction.

The power transmission device 40 mounted to the front end of the frame 20 includes a motor 42, a guide wheel 46, and a gear reduction set 44 which connects the output end of the motor 42 and the guide wheel 46. The guide wheel 46 includes two casings 460 mounted onto a shaft 462 which is parallel to a first axis on the ground. Eight separation members 464 are mounted on the counter ends of the two casings 460 at even intervals. Each driving roller 466 is mounted in the space between two of the separation members 464. The driving rollers 466 protrude from the outer surface of the casings 460 so as to be able to contact with the ground.

The distance detection device 60 includes two physical or virtual index members 62 which may be attached to two separate positions on a user's body and be removed from the user's body if necessary. The index members 62 emit or reflects individual signals, such as ultra-sonic signals, laser, infrared light, or visible light. When the user moves forward or backward, the index members 62 move with the two separated positions of the user's body. Thereafter, the distances of the two separated positions to the frame 20 are changed. In this embodiment, the two separated positions are located on the ankles of the user's legs, and the index members 62 emit ultrasonic signals The distance detection device 60 further includes a detection member 64, which is fixed on the frame 20 and located in front of the zone 24. In this embodiment, two ultrasonic detection members 64 are used and located in front of the zone 24 for receiving signals from the two index members 62, and then sending signals to the control device 80.

The control device 80 located above the power transmission device 40 receives the signals from the distance detection device 60 and calculates the distances from the ankles of the user to a reference vertical plane on the frame 20, as well as the average of the distances. The average of the distances is compared with a pre-set value so as to accordingly send a control signal to the motor 42 of the power transmission device 40 through a wired or wireless communication method.

Figure 5:
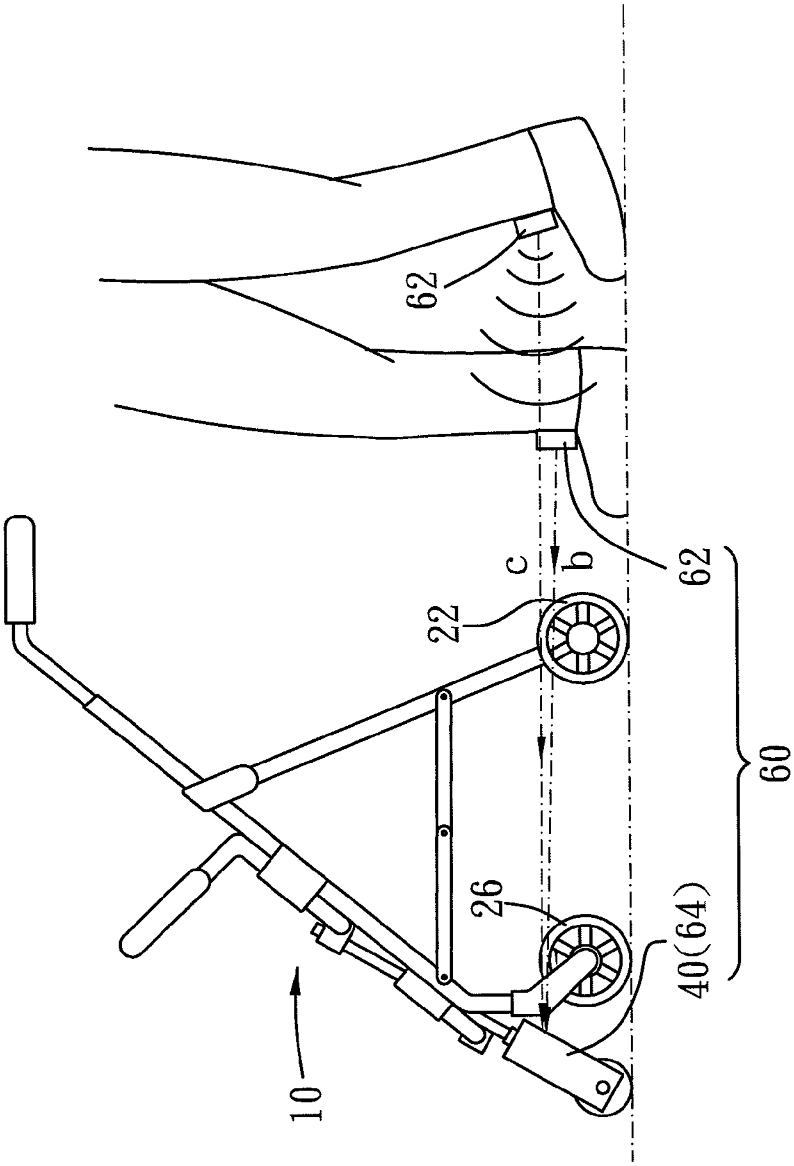
FIG. 5 shows the using status of one embodiment of the walking assistance device according to the present invention.
Figure 6:
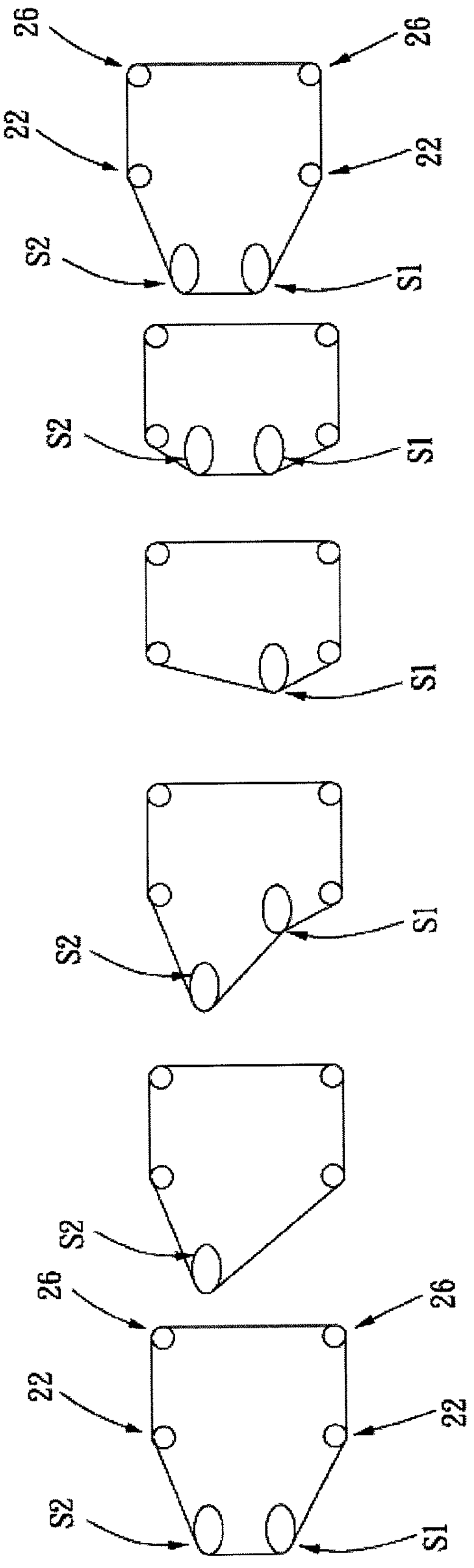
FIG. 6 shows the using statuses, viewed from top, of one embodiment of the walking assistance device according to the present invention.

FIG. 5 shows that the interaction between the index members 62 and detection members 64. FIG. 6, from left to right, shows the continuous steps of the user who moves forward by stepping out the right leg S1, and then the left leg S2, and then stops.

When the difference between the pre-set value and the average of the distances is smaller than an acceptable value, the control device 80 determines that the current motion status of the frame 20, either stationary for moving, can keep the user within the zone 24, and no different control signal is sent to the power transmission device 40. For instance, the pre-set value is 34 cm and the acceptable value is 2 cm. When the distances from the left ankle and right ankle of the user to the reference vertical plane on the frame 20 are 32 cm and 35 cm, the average of the two distances is 33.5 cm and has 0.5 cm difference from the pre-set value. For that the difference is not more than the acceptable value (2 cm), no different control signal is required.

When the average of the distances from the left ankle and right ankle of the user to the reference vertical plane on the frame 20 is less than the pre-set value, and the difference is more than the acceptable value, the control device 80 determines that the two legs of the user are too close to the frame 20, and then sends a different control signal, e.g. to increase speed, to the motor 42 for driving the guide wheels 46 to move the frame 20 away from the user.

On the contrary, if the average of distances from the left ankle and right ankle of the user to the reference vertical plane on the frame 20 is more than the pre-set value, and the difference is more than the acceptable value, the control device 80 determines that the user's two legs are far behind the zone 24. Therefore, a different control signal, e.g. to reduce speed, is sent to the motor 42 for driving the guide wheels 46 to move the frame 20 close to the user so as to provide a support to the user and reduce the risk of falling.

Figure 7:
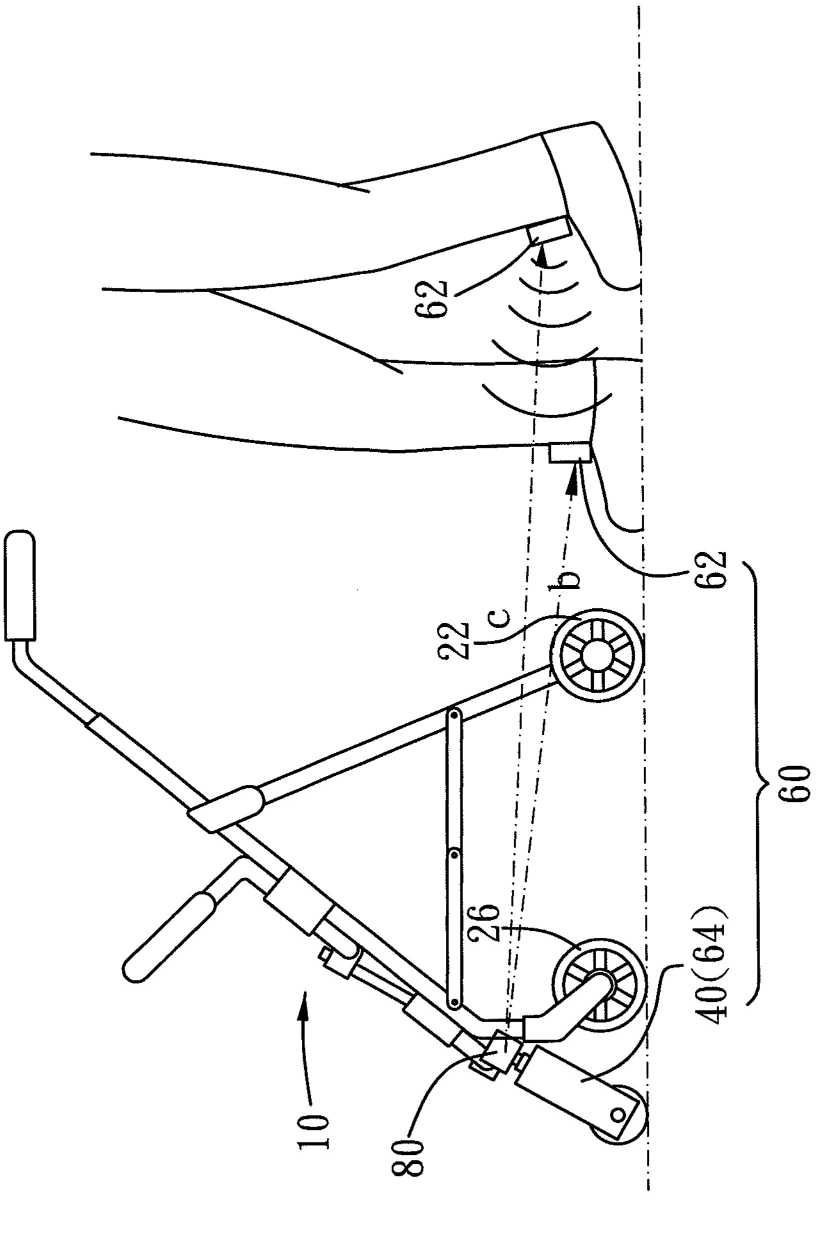
FIG. 7 shows the using status of another embodiment of the walking assistance device according to the present invention.

As described above, the two index members 62 emit signals to the distance detection device 60 for the control device 80 to determine the distance between the user and the frame 20. In another embodiment, as shown in FIG. 7, when the two index members 62 are set to reflect signals, a signal emitting member is mounted to the front end of the frame 20 and installed in the control device 80. The signals emitted from the signal emitting member are reflected from the two index members 62 and received by the distance detection device 60. The control device 80 detects, calculates, and determines the signals, and then generates control signals to operate the walking assistance device 10.

In the embodiments of present invention, the zone 24 is defined as the area between the fixed-direction wheels 22. For that the fixed-direction wheels 22 can only move back and forth, it is possible to prevent the user from falling aside. Actually, the zone 24 can also be defined as the area that is located slightly behind the fixed-direction wheels 22.

It is noted that the motor 42 is not necessarily connected to the guide wheel 46, but can also be connected to the fixed-direction wheels 22 or the turning wheels 26.

While we have shown and described the embodiment according to the present invention, it should be clear to those who skilled that further embodiments may be made without departing from the scope of the present invention.

What is claimed is:

1. A walking assistance device comprising:

a movable frame having a front end and a rear end;

two fixed-direction wheels connected to the rear end of the frame and rotatable toward a pre-set direction;

at least one guide wheel connected to the front end of the frame;

a power transmission device supported on the frame mid operatively connected to at least one of the wheels;

a distance detection device including two index members connected to a user's leas for sending signals and at least one signal detection member connected to the frame for receiving the signals; and a control device for receiving the signals from the signal detection member, calculating the average of the distances based on the signals, and instructing the power transmission device to drive the at least one of the wheels forward or backward if the average is beyond a preset range.

2. The device of claim 1, including two turning wheels located in front of the fixed-direction wheels.

3. The device of claim 1, wherein the guide wheel includes at least one casing which is rotatable about a major axis, and multiple rollers each connected to the casing and rotatable about a minor axis.

4. The device of claim 3, wherein the major axis is perpendicular to each of the minor axes.

5. The device of claim 1, wherein the power transmission device includes a motor connected to the at least one of the wheels.

6. The device of claim 1, wherein the signals are ultra-sonic signals, laser, infrared light, or visible light.

7. The device of claim 1, wherein the guide wheel, the power transmission device and the control device are removable from the frame, and the index members are removable from the legs of the user.

8. A walking assistance device comprising:

a movable frame having a front end and a rear end;

two fixed-direction wheels connected to the rear end of the frame;

at least one guide wheel mounted to the front end of the frame;

a power transmission device mounted to the frame and connected to at least one of the wheels;

a distance detection device including two index members connected to a user's legs, at least one emitter connected to the frame for emitting signals to the index members, and at least one receiver connected to the frame for receiving the signals reflected from the index members; and a control device for receiving the signals from the receiver, calculating the average of the distances based on the signals, and instructing the power transmission device to drive the at least one of the wheels forward or backward if the average is beyond a preset range.

9. The device of claim 8, wherein the guide wheel includes at least one casing which is rotatable about a major axis, and multiple rollers each connected to the casing and rotatable about a minor axis.

10. The device of claim 8, wherein the power transmission device includes a motor connected to the at least one of the wheels.

11. The device of claim 8, wherein the signals are ultra-sonic signals, laser, infrared light, or visible light.

12. The device of claim 8, wherein the guide wheel, the power transmission device and the control device are removable from the frame, and the index members are removable from the legs of the user.

* * * * *